US 6,697,999 B1

(12) United States Patent
Breuer et al.

(10) Patent No.: US 6,697,999 B1
(45) Date of Patent: Feb. 24, 2004

(54) COMPUTER-BASED AUTOMATIC DOCUMENT FORMATTING METHOD

(75) Inventors: Matthias Breuer, Seevetal (DE); Jürgen Pingel, Geesthacht (DE)

(73) Assignee: Sun Microsystems, Inc., Santa Clara, CA (US)

( * ) Notice: Subject to any disclaimer, the term of this patent is extended or adjusted under 35 U.S.C. 154(b) by 375 days.

(21) Appl. No.: 09/693,150

(22) Filed: Oct. 20, 2000

(30) Foreign Application Priority Data

Oct. 20, 1999 (EP) .............................. 99120088

(51) Int. Cl.$^7$ .............................. G06F 17/21
(52) U.S. Cl. ...................... 715/517; 715/513
(58) Field of Search .................. 707/513, 517, 707/530, 531, 522, 523; 715/613, 517, 530, 531, 522, 523

(56) References Cited

U.S. PATENT DOCUMENTS

| | | | |
|---|---|---|---|
| 4,813,010 A | | 3/1989 | Okamoto et al. |
| 5,900,004 A | * | 5/1999 | Gipson ..................... 707/530 |
| 6,026,417 A | * | 2/2000 | Ross et al. ................. 707/517 |
| 6,088,711 A | * | 7/2000 | Fein et al. ................. 707/523 |

FOREIGN PATENT DOCUMENTS

EP   0 650 129 A2   4/1995

OTHER PUBLICATIONS

*Laura Lemay's Web Workshop, Microsoft FrontPage 97*, Sams.net Publishing, 1997, pp. 26–28, 412–413, 733, 734, 736–759.*

Peels, A., et al., "Document Architecture and Text Formatting," ACM Transactions on Office Information Systems, vol. 2, No 4, pp 347–369, Oct., 1985.

Iwai, I., et al. "A Document Layout System Using Automatic Document Architecture Extraction," Proceedings on Conf. on Human Factors in Computing Systems, CHI'89, pp369–374, May, 1989.

* cited by examiner

*Primary Examiner*—Stephen S. Hong
(74) *Attorney, Agent, or Firm*—Gunnison, McKay & Hodgson, L.L.P.; Forrest Gunnison

(57) ABSTRACT

A computer-based method for improved automatic formatting of a document provides easier accepting and rejecting of formatting actions made by the automatic formatting method. In particular, the user inputs a document, or any part of a document, into a computer system. For each document portion that the user wants formatted in a particular way, the user delimits that portion of the document with a unique format identification feature that corresponds to a format rule. When the user initiates the computer-based automatic formatting method, the method identifies each document portion in the document delimited by at least one format identification feature, and applies to that document portion a format rule corresponding to the at least one format identification feature. The method displays an indicium of the format rule together with the document portion thereby displaying the format rule and the document portion together. The method then receives a user input accepting or rejecting the displayed format rule. The display together of the document portion and an indicium of the format rule applied to that document portion permits the user to decide easily and unambiguously whether the automatic formatting is desired.

14 Claims, 5 Drawing Sheets

```
201  II
     Headline ExampleII                                         295A
     II 202  This is an example of the use of bold and
     _underline_ format rule specification
     features.

203  This is an example of inserting a dash:
     x--xx.

204  -This is an example of an automatic bulleting pattern.
     -.-This continues the automatic bulleting pattern.
     -This also continues the automatic bulleting pattern.

205  *This is a different example of automatic bulleting.

206  This is an example of automatic table
     generation.

| FORMAT RULES ||
| Input | Action |
|---|---|
| abc | Bold abc |
| _abc_ | Underline abc |
| II<br>Text<br>II | Convert Text to Headline |
| -Paragraph | Number Paragraphs Sequentially and Indent First Line |
| +___+ | Table Cell |
|  |  |
| *Paragraph | Insert Bullet and Indent First Line |

FIG. 2B

HEADLINE EXAMPLE

This is an example of the use of bold and underline format rule specification features. — 297

This is an example of inserting a dash:
x — xx.

Automatic Format Change Table — 296

| Rule | Description | Document Portion |
|---|---|---|
| Headline | Gens Headline | HEADLINE EXAMPLE |
| Bold | Bold text | bold |
| Underline | Underlines text | underline |
|  | • | |
|  | • | |
|  | • | |

COMPUTER-BASED AUTOMATIC DOCUMENT FORMATTING METHOD

BACKGROUND OF THE INVENTION

1. Field of the Invention

The present invention relates generally to document formats and more particularly to a method for automatically formatting documents in a computer system.

2. Description of Related Art

Different types of documents are frequently formatted in a different way. For example, letters, articles, and books have normally a different layout, that means a different format. There are several possibilities to apply a certain format to a document. The easiest way is to give the different passages in the document a certain format during the creation of the document, for example, headlines, which were formatted in a different type of characters.

It is also possible to apply the format after the document has been created, that means to create the document in a standard format and to apply the final format after the document itself, for example the text, has been set out. There exist office applications, which allow the user to employ an automatic formatting function for automatically formatting the document.

Such automatic formatting functions identify for each document portion, for example, for each chapter of a text document, the required format and apply that format to each document portion. This identification of the format required for a certain document portion is effected with the help of one or more identification features, which corresponds to a certain format, constituting a formatting rule. If a certain document portion includes the identification features for a specific formatting rule, the corresponding format has been identified as the required format for this document portion. The connection between identification features and formats, the formatting rules, was laid down in an internal catalog of the computer system. The so identified required format may then be applied immediately to the corresponding document portion.

This kind of automatic formatting lacks efficiency. For example, if the formatting function has applied several different formatting rules and has applied some formatting rules repeatedly the user cannot reject the repeatedly applied formatting rule for all document portions to which it was applied in a single step. To reject one formatting rule, the user has to skip manually through the document and manually reject each formatting action corresponding to this formatting rule.

Furthermore, prior art formatting is frequently not transparent enough, that means the user cannot easily follow or recognize the formatting actions of the automatic formatting function. This leads to additional controlling efforts or to insecurity of the user. That means the prior art automatic formatting functions frequently and in many respects do not meet consumer expectations.

SUMMARY OF THE INVENTION

According to the principles of this invention, a method for improved automatic formatting of a document provides easier accepting and rejecting of formatting actions made by the automatic formatting method. In particular, the user inputs a document, or any part of a document, into a computer system without worrying about the formatting. For each document portion that the user wants formatted in a particular way, the user delimits that portion of the document with a unique format identification feature that corresponds to a format rule.

When the user initiates the computer-based automatic formatting method of this invention, the method identifies each document portion in the document delimited by at least one format identification feature, and applies to that document portion a format rule corresponding to the at least one format identification feature.

The method displays an indicium of the format rule together with the document portion thereby displaying the format rule and the document portion together. The method then receives a user input accepting or rejecting the displayed format rule. The display together of the document portion and an indicium of the format rule applied to that document portion permits the user to decide easily and unambiguously whether the automatic formatting is desired.

Typically, the method of this invention performs the identifying, applying, and displaying operations for a plurality of document portions with each document portion in the plurality delimited by at least one format identification feature where each different format identification feature has a corresponding format rule. The method also includes filtering the plurality of document portions according to at least one filtering criterion thereby selecting a group of document portions. In this case, the displaying operation comprises displaying each document portion in the group of document portions together with the indicium of the format rule applied to the document portion.

This filtering greatly simplifies the utilization of the automatic formatting method. The user can choose easily to accept or reject a certain kind of applied formatting rules, for example, all formatting rules, and that means all formatting actions regarding headlines. The user is not forced to pick all headline formats one by one from the document and accept or reject them individually. The user does not even have to think about the question, in the headline example, whether a document portion is a headline or not. The user, instead, can rely on the internal table or on the display, which already list the headlines together with the applied formatting rules.

The filter criterion in the filter operation is selected from at least one of the applied formatting rules, the position of the identified document portions in the document, or perhaps a date of first application of one of the format rules to the identified document portions.

Herein, a storage medium comprises a plurality of formatting rules, wherein each of the formatting rules comprises at least one formatting rule specific identification feature and a formatting rule specific format. Each of the formatting rules shall be applied to a document portion if the document portion contains the at least one formatting rule specific identification feature.

In another embodiment, the method according to the present invention comprises:

a) identifying document portions in a document, wherein each of the document portions contains the at least one formatting rule specific identification feature for at least one of a plurality of formatting rules, thereby assigning at least one of the formatting rules to each of the document portions, b) applying to each of the identified document portions the at least one of the formatting rules assigned to the identified document portion;

c) displaying the applied formatting rules together with the identified document portions, and d) accepting or rejecting each of the displayed formatting rules for each of the identified document portions according to user input.

In the scope of the present invention, a computer system includes a software application running on the computer system. The software application applies to the identified document portions the assigned one or more formatting rules, that means the software application formats these document portions accordingly. This formatting of the various document portions is done successively, that means document portion per document portion. It may be noted that this formatting technically is a re-formatting, because a format according to a formatting rule is applied to a document, which naturally has some format, namely a standard format. Such a standard format document is considered unformatted in the scope of the present invention.

Each formatting action, that means each application of a formatting rule to a document portion, is listed in an internal table. In this internal table at least information about the applied formatting rules and about the document portions to which each of the formatting rules has been applied are stored. This table reflects the assignment of applied formatting rules to the document portions of the document. In the scope of the present invention, the applied formatting rules are displayed on an output device, for example a monitor of the computer system, together with the identified document portions, that means the document portions to which these formatting rules have been applied. The display together allows, but does not require, a display in the same table or graphical window. It is possible and sufficient to display the formatting rules applied to a certain document portion in a window and to show this document portion in a second window, for example in a background window.

The display of the formatting rules together with the relevant document portions allows the user to accept or reject each formatting action that means each application of a formatting rule to a document portion, by knowing the applied formatting rule from a displayed list. The accepting and rejecting can be affected simply by a mouse-click or, as well, by any other input device and operating scheme.

BRIEF DESCRIPTION OF THE DRAWINGS

FIG. 2A is an illustration of a display that includes a document input by a user in the standard format with a plurality of format identification features for one embodiment of this invention.

FIG. 2B is an example of format rules that are stored in a memory for one embodiment of this invention.

FIG. 2D is an illustration of one embodiment of displaying document portions and the indicium of the format rules applied to those document portions together.

In the drawings, elements with the same reference numeral are the same element.

DETAILED DESCRIPTION

Figure 1:
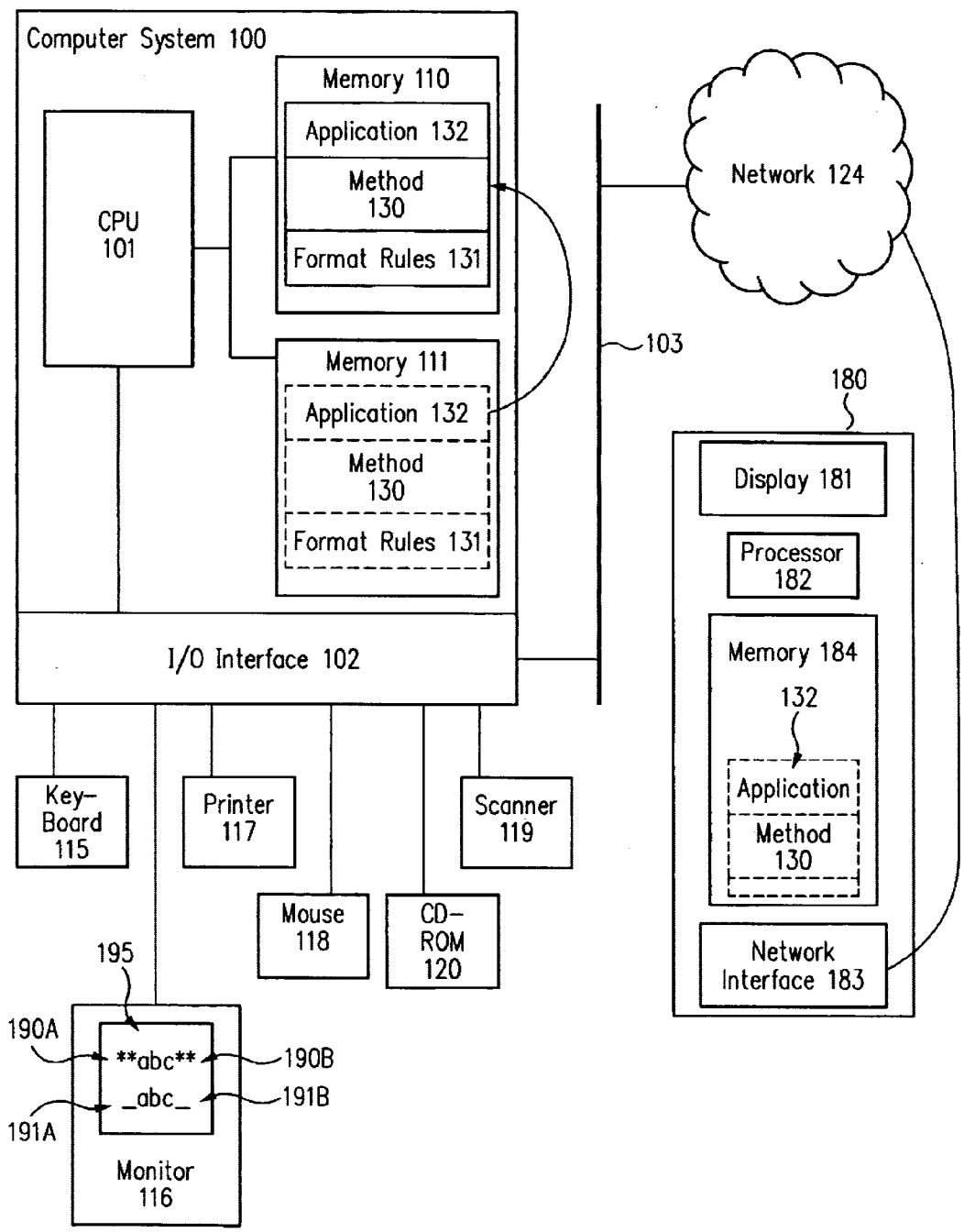
FIG. 1 is a diagram of a computer system in a computer network that includes the automatic formatting method of this invention.

According to the principles of this invention, as a user enters information for a document using an input device, e.g., keyboard 115, of computer system 100, the user enters format identification features 190A, 190B and 191A, 191B along with the information that are shown in display 195 of monitor 116. In this embodiment, each pair of format identification features 190A, 190B and 191A, 191B is used to delimit a different portion of the document to which a particular format is to be applied.

When the user applies a set of format rules 131 to the document via a method 130 of an application 132 executing on computer system 100, the document is automatically formatted. In particular, as each format identification feature is detected, a rule in format rules 131 corresponding to the detected format feature is applied to the portion of the document delimited by the format identification feature. Method 130 generates a table where each entry includes an indicium of a format rule and the document portion to which that format rule was applied, or alternatively a link to the document portion.

This table is displayed on monitor 116 along with the document. The display of the indicia of the formatting rules together with the relevant document portions allows the user to accept or reject each formatting action, that means each application of a formatting rule to a document portion, by knowing exactly which formatting rule was applied to which document portions. The accepting and rejecting of the formatting of each or all document portions can be effected simply by a mouse-click or, as well as, by any other input device and operating scheme. Hence, method 130 improves automatic formatting of a document, and provides easier informed acceptance and rejection of formatting actions.

As used herein, documents for inventive method 130 are understood to be data files suitable for being stored and processed on computer systems in general, including, but not limited to, text documents, spreadsheets, tables, pictures or any other set of data representing information. A computer system, which is able to carry out inventive method 130, comprises, in one embodiment, a processor, a storage medium, an input device and an output device. The storage medium can be a hard disk, a floppy disk, a tape, flash memory, static random access memory, random access memory, a CD-ROM or anything comparable within the computer system, or accessible by the computer system over a network.

According to the principles of this invention, a formatting rule that is used in method 130 is a rule for applying a specific format to an identified document portion. The document portion identification is performed by one or more format identification features per formatting rule. Each format identification feature contains specific particularities for a certain type of document portion. The particularities are chosen so that the format identification feature or features are unique within the certain type of document portion and so can unambiguously be used to identify the certain type of document portion.

In the embodiment of FIG. 1, the memory of computer system 100 is divided into a volatile memory 110, like a working memory, and a non-volatile 15 memory 111, like a hard disk. In addition, to keyboard 115, and monitor 116, that are connected to processor 101 via I/O interface 102, computer system 100 also may have, for example, a printer 117, a mouse 118, a scanner 119 and CD-ROM 120 connected to I/O interface 102. Frequently, computer system 100 also is connected to a network 103 via I/O interface 102. Optionally, network 103 can be connected to, or part of a larger network 104, for example the Internet or a wide area network.

Computer-based automatic formatting method 130 of this invention typically is used for formatting a technical article, such as a medical or scientific paper, a book, or perhaps a magazine article. The article contains, for example, headlines, lists and certain terms, which should be highlighted in the article. However, herein, simple examples are used to demonstrate the principles of the invention.

Initially, application 132 with method 130 is stored on non-volatile memory 111, and as application 132 is executed on processor 101, all or at least part of application 132 is loaded into volatile memory 110. Computer application 132 offers the user the choice of whether automatic formatting method 130 should be carried out during the creation of the document, or carried out at a certain point in time, such as after completion of the document. The user may choose, for example, the latter option. Therefore, after the user has finished entering the document, automatic formatting method 130 is utilized.

In either case, in input document operation 301, a user enters the document on computer system 100 without considering the format of the various portions of the document using application 132 that includes method 130 of this invention. This means that the document is entered in a standard format using application 132. For the example in FIG. 2A, the document is entered in a simple text format.

In entering the document, as illustrated in display 295A (FIG. 2A), the user first enters an empty paragraph, which is represented by only a paragraph mark. Next, the user enters a line without any punctuation at the end, and then another empty paragraph. Document portion 201 is a line of text without a punctuation mark at the end that is delimited by an empty paragraph on either side.

Next the user enters another document portion 202 that is delimited above and below by an empty paragraph. However, this document portion includes a punctuation mark at the end and so is different from first document portion 201 that did not include a punctuation mark at the end of the text.

Document portion 202 includes two other document portions. The first is the word bold that is delimited by ** on either side, and the second is the word underline that is delimited by an underscore on either side.

Segment 203 that is input by the user includes a document portion that is two dashes delimited by a space on either side.

Segment 204 includes three document portions. Each document portion (each line) starts with a dash and ends with a paragraph mark (not shown). There is no space between the dash and the first character in the paragraph. Thus, this document portion is a paragraph that is delimited by the dash as the first character of the paragraph.

Segment 205 includes a single document portion. This document portion (each line) starts with a star (*) and ends with a paragraph mark (not shown). There is no space between the star and the first character in the paragraph. Thus, this document portion is a paragraph that is delimited by a star (*) as the first character of the paragraph.

In another embodiment (not shown), a plus sign (+) as the first character in a paragraph is also used to delimit a document portion that is a paragraph. There is no space between the plus sign and the first character in the paragraph. In yet another embodiment (not shown), a number that is the first character of a paragraph is also used to delimit a document portion that is a paragraph. There is no space between the number and the first character in the paragraph.

Segment 206 includes a document portion that starts with a plus sign that is followed by a series of dashes, another plus sign, another series of dashes, yet another plus sign, yet another series of dashes followed by still another plus sign. This document portion is a series of dashes delimited on either side by a plus sign.

Notice that the user has simply input data without regard to formatting the data. Instead, the user has input unique delimiters, called format identification features, at locations where the user desires a particular type of formatting.

Figure 3:
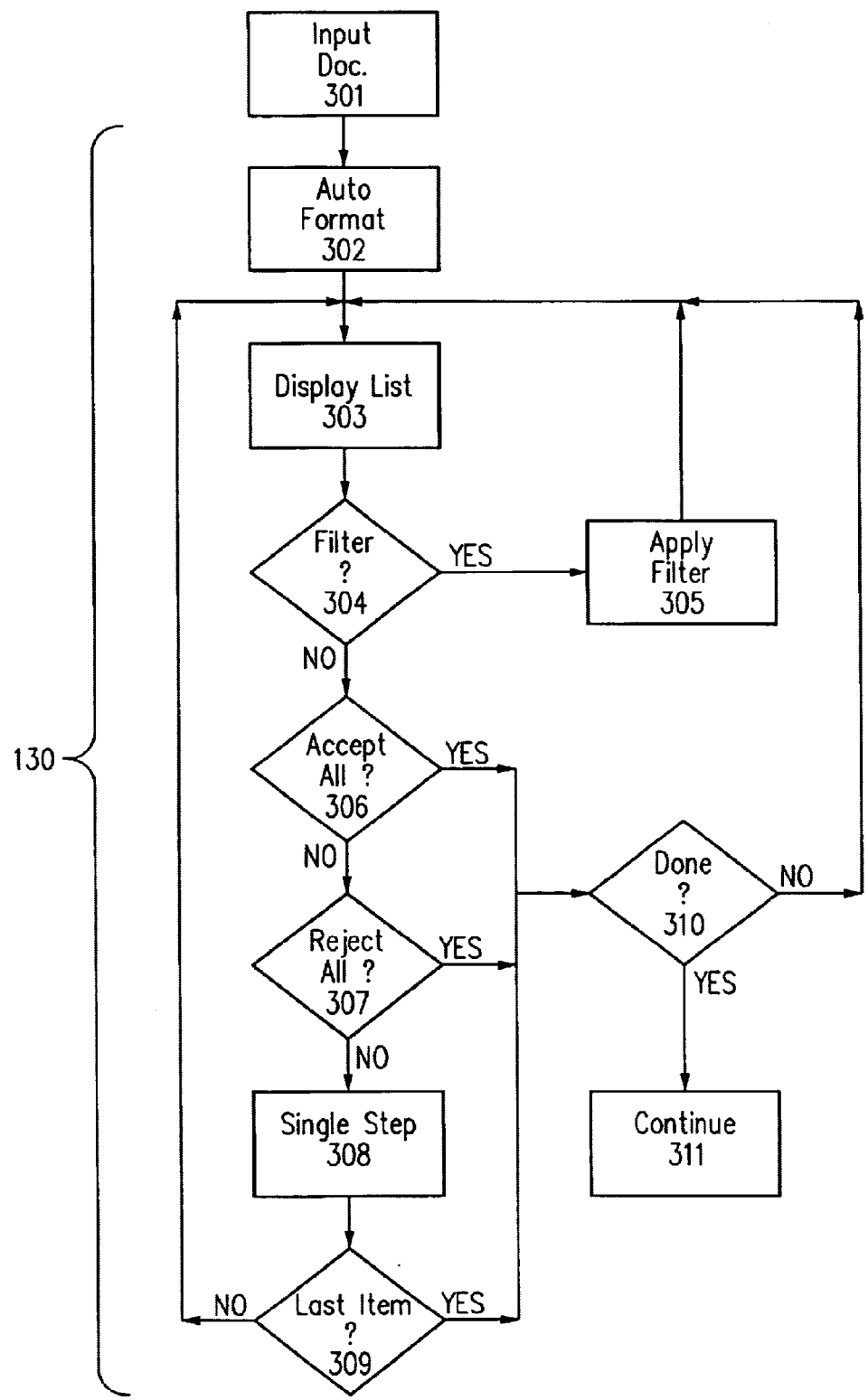
FIG. 3 is a process flow diagram for one embodiment of this invention.

After inputting the document in input documentation operation 301, the user activates method 130 of this invention in automatic format operation 302 (FIG. 3). In automatic format operation 302, the document is scanned. Each format identification feature or features is detected, and the document portion delimited by the format identification feature is identified. A format rule corresponding to the detected format identification feature or features is retrieved from format rules 131 and applied to the identified document portion. This formatting of the various delimited document portions is done successively, i.e., document portion per document portion. Hence, from the user's perspective, the format rules 131 are applied automatically to the document.

This formatting technically is a re-formatting, because a format according to a formatting rule is applied to a document, which naturally already has some format, namely a standard format. Such a standard format document is considered unformatted in the scope of the present invention.

Each formatting action, that means each application of a formatting rule to a document portion, is listed in an internal automatic format change table. In this internal automatic format change table, at least information about the applied formatting rules and about the document portions to which each of the formatting rules has been applied is stored in a memory of computer system 100. This table reflects the assignment of applied formatting rules to the document portions of the document.

Figure 2C:
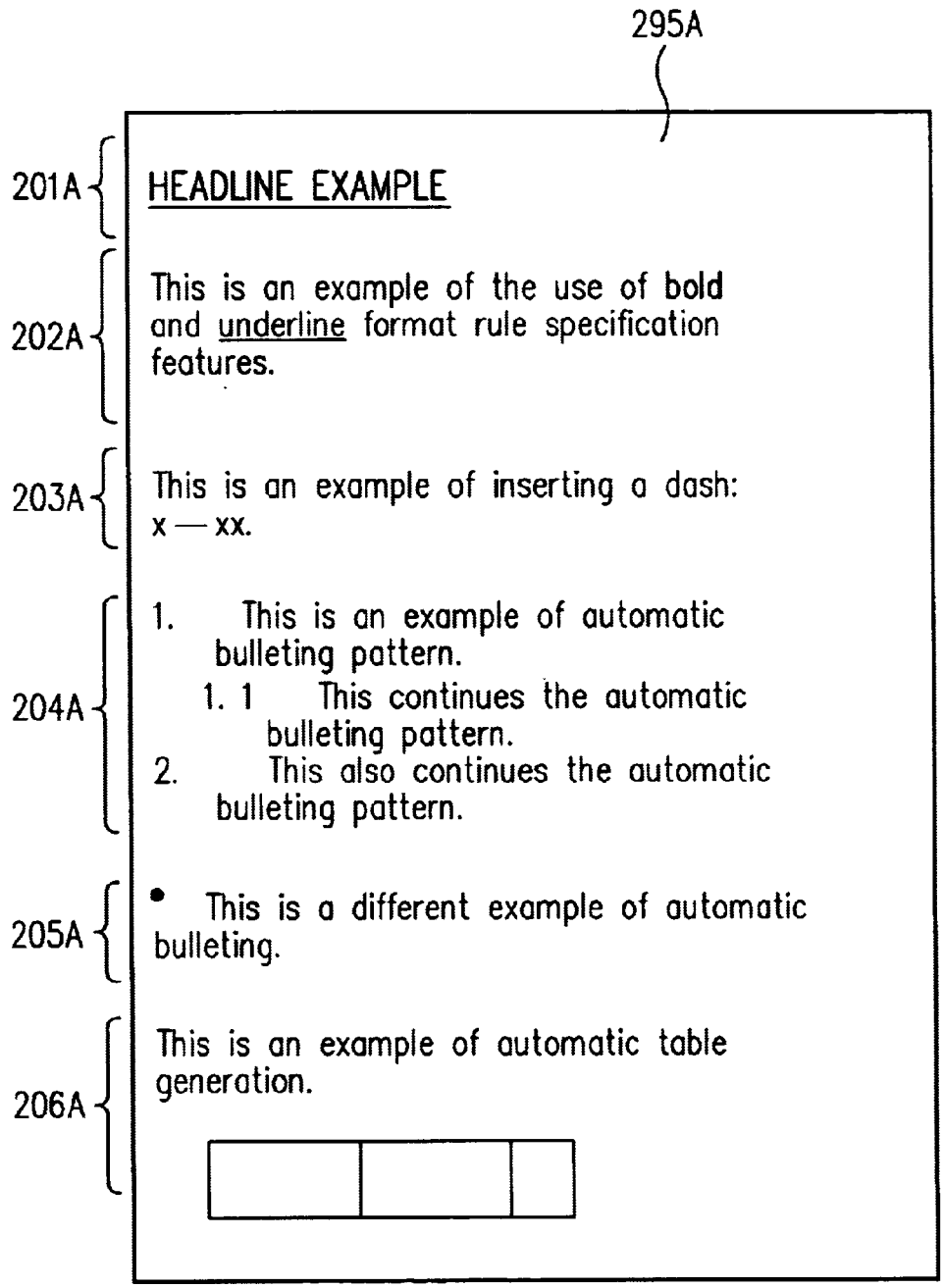
FIG. 2C is an illustration of the document in FIG. 2A after the format rules of FIG. 2B are applied for one embodiment of this invention.

In this example, FIG. 2B is a pseudo-code representation of format rules 131. When operation 302 scans the document in display 295 (FIG. 2A), each of the document portions that does not end with a punctuation mark like a period, comma, or semicolon and that is delimited by a paragraph before the document portion and a paragraph behind that document portion being empty is identified as a headline. The format rule corresponding to these format identifications features (e.g., the format specification in the column Action that is in the same row as the delimited document portion in the column Input of format rules 131 in FIG. 2B,) is applied to the document portion so that the document portion automatically is formatted in a certain "headline" format, e.g., with the font Arial, with bold letters and underlined. Hence, document portion 201 is presented as a headline 201A in FIG. 2C.

In general, each document portion, which is not identified as being a headline, and which begins with a format identification feature that is one of a dash (-), a star (*), a plus sign (+) or a number, is formatted as a list with enumeration or numbering according to a list format associated with the particular format identification feature in format rules 131.

Thus, for the document in display 295A, sections 204 and 205 are formatted according to the corresponding format rules given in format rules 131 (FIG. 2B) for a dash format identification feature that delimits a paragraph and a star format identification feature that delimits a paragraph, respectively.

While it is not illustrated in FIG. 2A, in one embodiment of automatic format operation 302, if the user highlighted a term in the document, the highlighting is detected as a format identification feature. A format rule in format rules 131 that corresponds to the highlight format identification feature results in the highlighting of all words including the highlighted term throughout the document, or throughout a user selected portion of the document in operation 302. Here, a term can be either a complete word, or simply a sequence of characters.

Automatic format operation 302 also scans the document to identify representative format identification features for identifying a word or sequence of characters, which shall be formatted in a certain way. For example, if a word is surrounded by two stars without any space in-between, automatic format operation 302 retrieves a corresponding format rule, which result in formatting this word in bold letters. The stars are suppressed. If a word is surrounded by an underscore without any space in-between, automatic format operation 302 underlines the word. Hence, section 202 is formatted as shown in section 202A (FIG. 2C). If a space, two dashes and another space are encountered, this format identification feature corresponds to a format rule specifies that the two dashes be replaced with a long dash.

Note that herein a word is only be used as a convenient example. The characters or symbols included between format identification features can be of any length. The format rule corresponding to the format identification features is applied to the characters delimited by, i.e., bounded by, the format identification features.

Finally, in this embodiment, if format identification features are detected that include plus signs and dashes, a table is generated according to a corresponding format rule. In the embodiment of FIG. 2A, a table with a single row with a default height is generated as illustrated in FIG. 2C. Alternatively, the user could have keyed in the actual size of the row by using plus signs for the column locations. Since a user typically would want to enter data in the table, the user normally would key in the structure for the table using plus signs and dashes, and then immediately apply automatic format method 130 to generate the actual table.

The formatting rules and the associated format identification features presented herein are illustrative only of the invention and are not intended to limit the invention to the specific format rules and format identification features presented. In view of this disclosure, those of skill in the art can implement various rules and use any convenient format identification feature.

After automatic format operation 302 is completed by application 132, display list operation 303 in application 132 generates a window with a listing of all formatting actions taken in automatic format operation 302, i.e., the actions listed in the automatic format change table. This listing window can be, for example, in a foreground window 296 in display 295C (FIG. 2D), while the document itself is still present in a background window 297 in display 295C.

In general, indicia of the applied formatting rules are displayed together with the identified document portions that means the document portions to which these formatting rules have been applied. The display together allows, but does not require, a display in the same table or graphical window, e.g., window 296. It is possible and sufficient to display indicia of the formatting rules applied to a certain document portion in a first window and to show this document portion in a second window, for example in a background window.

Herein, the format rules are the actual instructions executed to format the document portion. The display of the format rule itself would not be meaningful. Consequently, an indicium of the format rule is displayed such as a name for the format rule.

In one embodiment, in the listing window, each formatting action is characterized, for example, by the name of the formatting action, i.e., the rule, by its user, by its date of application, and by a short description of its nature or effect. In window 296, the indicium of the rule in column Rule is a name, and a short description of the nature or effect of the rule is included in column Description.

Hence, in general, an indicium of each applied formatting rules is displayed together with the identified document portion, that means the document portions to which this formatting rule has been applied. The display together allows, but does not require, a display in the same table or graphical window. It is possible and sufficient to display the formatting rules applied to a certain document portion in a window and to show this document portion in a second window, for example in a background window.

The displayed listing can be sorted in an alphabetic order by the name of the formatting action, by the name of the user, or by the short description, or in a chronological order by date of application of the formatting action. The listing window provides also the possibility to filter all formatting actions based upon a filtering criterion. Hence, upon completion of display list operation 303, processing transfers to filter check operation 304.

The filter options available, in one embodiment, are the date of creation of this document portion, the user who applied certain formatting rules to the document portion, or formatting rules, or a combination thereof. If the use selects the filter option, processing transfers to apply filter operation 305 and otherwise to accept all check operation 306.

In filter operation 305, depending on the specification of the filtering criterion or criteria by the user, another automatic formatting table is generated that contains only the formatting actions that satisfy the filter criterion or criteria. Filter operation 305 transfers to display list operation 304 that in turn displays in the listing window only the formatting actions, which fulfill the filtering criterion. Filtering greatly simplifies the utilization of the automatic formatting. The user can choose easily to accept or reject a certain kind of applied formatting rules, for example, all formatting rules, and that means all formatting actions, regarding headlines. The user is not forced to pick all headline formats one by one from the document and accept or reject them individually.

The user does not even have to think about the question, in the headline example, whether a document portion is a headline or not. The user, instead, can rely on the displayed table in window 296, which after the filter operation lists the headlines together with the applied formatting rules. Again, if desired, the user can sort the items in the resulting window, as described above.

Accept all check operation 306 enables the user to accept all the formatting actions displayed in listing window 296 easily and quickly. If the user accepts all the formatting actions, the automatic format changes remain in the document and processing transfers to done check operation 3310. However, if the user does not accept all the formatting actions at once, processing transfers to reject all check operation 307.

Reject all check operation 307 enables the user to reject all the formatting actions displayed in list window 296 easily and quickly. If the user rejects all the formatting actions, the automatic format changes are removed from the document, and processing transfers to done check operation 310. However, if the user does not reject all the formatting actions at once, processing transfers single step operation 308.

In single step operation 307, the user can choose a single change made by automatic format operation 302. Alternatively, the user can choose some combination of changes. If the user wants to work on a single change, the user selects a change or combination of changes in the list in listing window 296 by employing an input device of the computer system, for example, a mouse 118. This causes the document portion corresponding to the selected change, or combination of changes, to be highlighted in the document. This document portion is accordingly shown in the background window. The user may then accept or reject the selected change or combination of changes, or choose another change in the list. After the user selects or rejects a change, single step operation 308, passed to complete check operation 309.

If the user has processed each of the entries in the list, complete check operation 309 transfers to done check operation 310 and otherwise returns to display list operation 303. Done check operation 310 determines whether the user has accepted or rejected all the format changes, or has generated an input signal to discontinue automatic formatting. If any of these conditions are true, processing transfers to continue operation 311 and otherwise to display list 303, which displays the most recently generated list of formatting actions that contains an entry that the user has not either accepted or rejected.

In the above description, operations 304, 306, 307, 308, and 309 were described, and are shown in FIG. 3, sequentially. However, this is illustrative only and is not intended to limit the invention to the specific sequence of operations described. Those of skill in the art will appreciate that the filter, accept all and reject all operations could be performed at any point in time. Similarly, a user could sort the list, select all the format changes associated with one format rule and accept or reject at one time all the format changes associated with that format rule. Similarly, the user can for example, reject all the formatting changes without doing either the accept all check operation, or the filter check operation. The actual sequence and selection of entries in the listing window will depend upon the user interface, which is not essential to this invention.

The above description assumed that method 130 and format rules 131 were associated with an application 132 that was stored and executed locally to computer system 100. However, alternatively, application 132 with format rules 131 and method 130 could be located on a server 180 and executed on a server processor 182 with only the display and input events occurring on computer system 100. Alternatively, the user may customize the format rules and so the format rules are stored locally, while application 132 and method 130 are stored remotely.

Herein, a computer program product comprises a medium configured to store or transport computer readable code for method 130 or in which computer readable code for method 130 is stored. Some examples of computer program products are CD-ROM discs, ROM cards, floppy discs, magnetic tapes, computer hard drives, servers on a network and signals transmitted over a network representing computer readable program code.

As illustrated in FIG. 1, this storage medium may belong to computer system 100 itself. However, the storage medium also may be removed from computer system 100. For example, method 130 may be stored in memory 184 that is physically located in a location different from processor 101. The only requirement is that processor 101 is coupled to the memory. This could be accomplished in a client-server system, e.g. system 100 is the client and system 180 is the server, or alternatively via a connection to another computer via modems and analog lines, or digital interfaces and a digital carrier line.

For example, memory 184 could be in a World Wide Web portal, while display unit 116 and processor 101 are in personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 100, in one embodiment, can be a portable computer, a workstation, a two-way pager, a cellular telephone, a digital wireless telephone, a personal digital assistant, a server computer, an Internet appliance, or any other device that includes the components shown and that can execute method 130. Similarly, in another embodiment, computer system 100 can be comprised of multiple different computers, wireless devices, cellular telephones, digital telephones, two-way pagers, or personal digital assistants, server computers, or any desired combination of these devices that are interconnected to perform, method 130 as described herein.

Accordingly, a computer memory refers to a volatile memory, a non-volatile memory, or a combination of the two in any one of these devices. Similarly, a computer input unit and a display unit refers to the features providing the required functionality to input the information described herein, and to display the information described herein, respectively, in any one of the aforementioned or equivalent devices.

In view of this disclosure, method 130 can be implemented in a wide variety of computer system configurations. In addition, method 130 could be stored as different modules in memories of different devices. For example, method 130 could initially be stored in a server computer 180, and then as necessary, a module of method 130 could be transferred to a client device 100 and executed on client device 100. Consequently, part of method 130 would be executed on the server processor 182, and another part of method 130 would be executed on processor 101 of client device 100. In view of this disclosure, those of skill in the art can implement the invention of a wide-variety of physical hardware configurations using an operating system and computer programming language of interest to the user.

In yet another embodiment, method 130 is stored in memory 184 of system 180. Stored method 130 is transferred, over network 104 to memory 111 in system 100. In this embodiment, network interface 187 and I/O interface 102 would include analog modems, digital modems, or a network interface card. If modems are used, network 104 includes a communications network, and method 130 is downloaded via the communications network.

Method 130 of the present invention may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, the present invention also relates to a data carrier for storing a computer program for carrying out the inventive method. The present invention also relates to a method for using a computer system for carrying out the presented inventive method. The present invention further relates to a computer system with a storage medium on which a computer program for carrying out the presented inventive method is stored.

We claim:

1. A computer-based method for automatically formatting a document comprising:

identifying a document portion in said document delimited by at least one format identification feature;

applying to said document portion a format rule corresponding to said at least one format identification feature to obtain a formatted document portion;

displaying an indicium of said format rule together with said formatted document portion thereby displaying said format rule and said formatted document portion together; and receiving a user input accepting or rejecting said displayed format rule.

2. The method of claim 1 further comprising performing said identifying, applying, and displaying operations for a plurality of document portions wherein each document portion in said plurality is delimited by at least one format identification feature wherein each different format identification feature has a corresponding format rule.

3. The method of claim 2 further comprising:

filtering said plurality of document portions according to at least one filtering criterion to select a group of document portions wherein each document portion in said group satisfies said at least one filtering criterion.

4. The method of claim 3 wherein said displaying operation comprises:

displaying each document portion in said group of document portions together with the indicium of the format rule applied to the document portion.

5. A method according to claim 3, wherein said at least one filtering criterion is at least one of said applied formatting rules.

6. A method according to claim 3, wherein said at least one filtering criterion is a position of said identified document portions in said document.

7. A method according to claim 3, wherein said at least one filtering criterion is the date of first application of one of said format rules to said identified document portions.

8. The method of claim 1 wherein said displaying operation displays said indicium of said format rule together with said formatted document portion in a table in a foreground window.

9. The method of claim 8 further comprising:

displaying said document in a background window.

10. A computer program product comprising a computer readable medium configured to store or transport computer code for a method for automatically formatting a document wherein upon execution of said computer code for said method, said method comprises:

identifying a document portion in said document delimited by at least one format identification feature;

applying to said document portion a format rule corresponding to said at least one format identification feature to obtain a formatted document portion;

displaying an indicium of said format rule together with said formatted document portion thereby displaying said format rule and said formatted document portion together; and receiving a user input accepting or rejecting said displayed format rule.

11. The computer program product of claim 10 wherein said method further comprises performing said identifying, applying, and displaying operations for a plurality of document portions wherein each document portion in said plurality is delimited by at least one format identification feature wherein each different format identification feature has a corresponding format rule.

12. The computer program product of claim 11 wherein said method further comprises:

filtering said plurality of document portions according to at least one filtering criterion to select a group of document portions wherein each document portion in said group satisfies said at least one filtering criterion.

13. The computer program product of claim 12 wherein said displaying operation comprises:

displaying each document portion in said group of document portions together with the indicium of the format rule applied to the document portion.

14. A system comprising:

a processor; and a memory, coupled to said processor, storing computer readable code for a method for automatically formatting a document wherein upon execution of said computer readable code for said method, said method comprises:

identifying a document portion in said document delimited by at least one format identification feature;

applying to said document portion a format rule corresponding to said at least one format identification feature to obtain a formatted document portion;

displaying an indicium of said format rule together with said formatted document portion thereby displaying said format rule and said formatted document portion together; and receiving a user input accepting or rejecting said displayed format rule.

* * * * *